Sept. 19, 1961 — H. W. WELSH — 3,000,614
ROTOR BLADE LOCKS
Filed June 11, 1958 — 3 Sheets-Sheet 1

INVENTOR.
Harvey W. Welsh
BY Paul Fitzpatrick
ATTORNEY

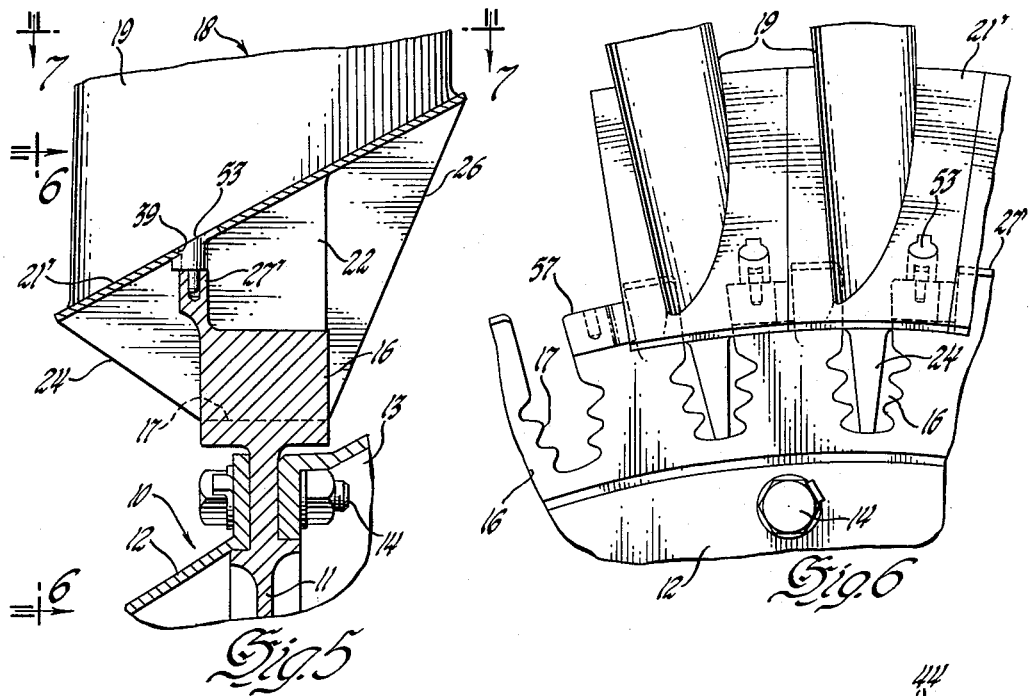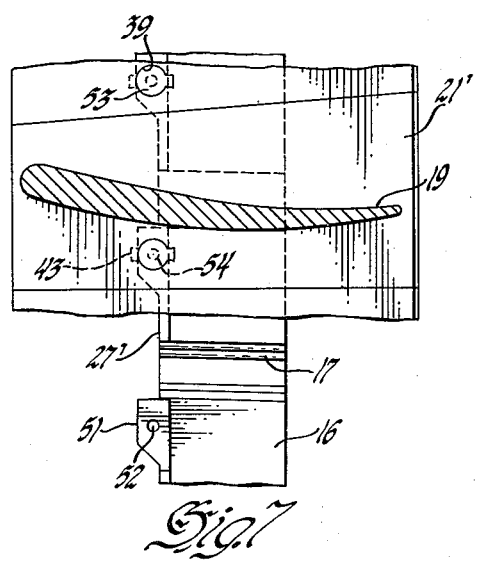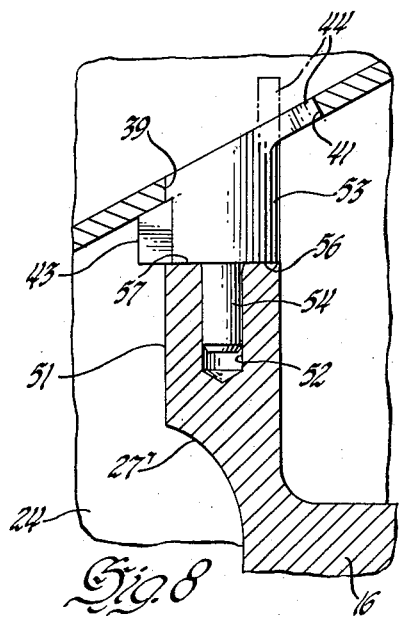

Sept. 19, 1961 H. W. WELSH 3,000,614
ROTOR BLADE LOCKS
Filed June 11, 1958 3 Sheets-Sheet 3
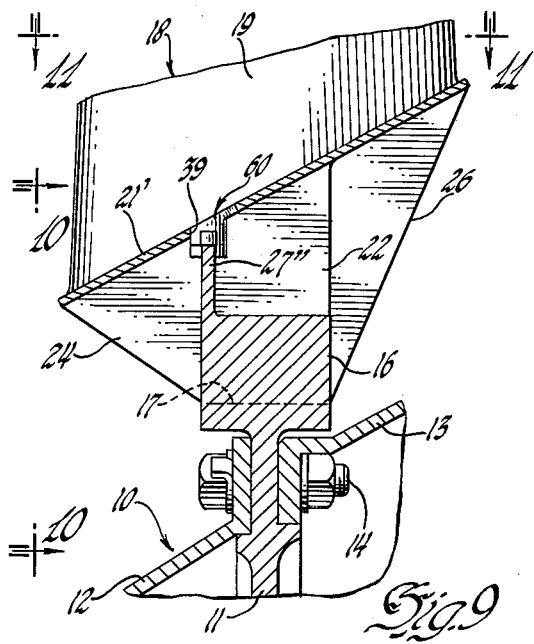
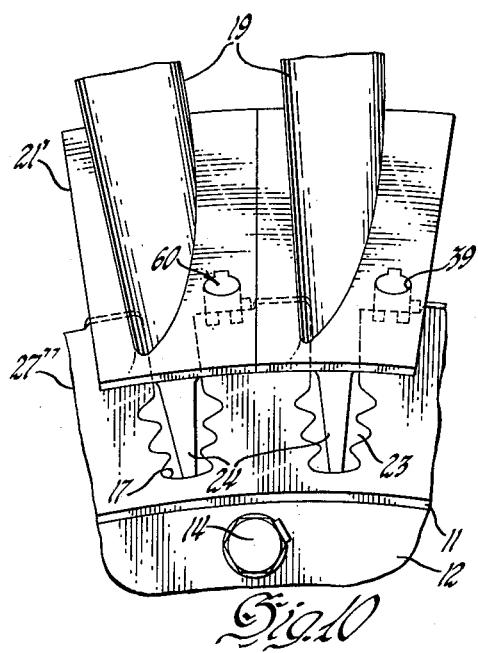
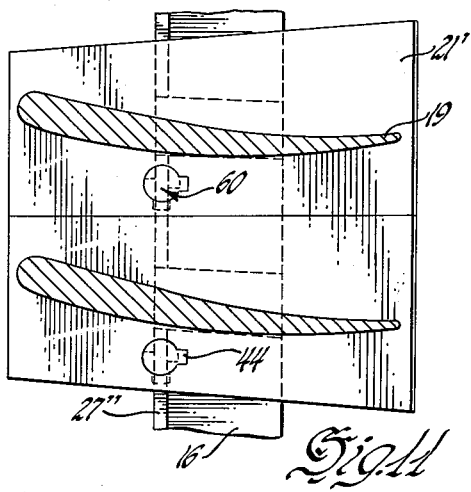
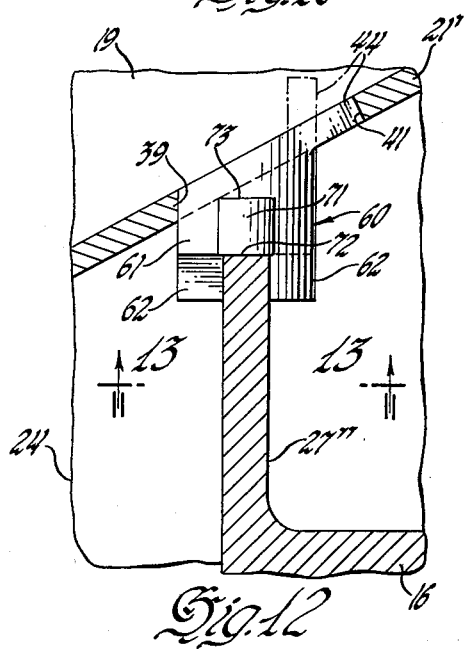
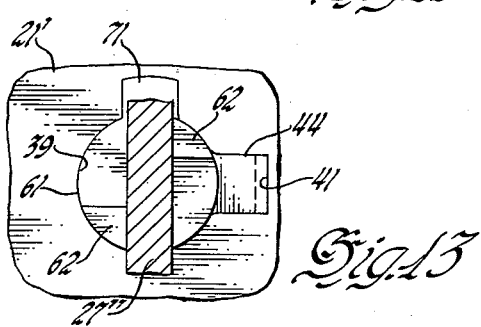
INVENTOR.
Harvey W. Welsh
BY Paul Fitzpatrick
ATTORNEY

United States Patent Office 3,000,614
Patented Sept. 19, 1961

3,000,614
ROTOR BLADE LOCKS
Harvey W. Welsh, Indianapolis, Ind., assignor to General Motors Corporation, Detroit, Mich., a corporation of Delaware
Filed June 11, 1958, Ser. No. 741,321
10 Claims. (Cl. 253—77)

My invention relates to blade locks for rotary machines, such, for example, as compressors and turbines. It is customary in such machines to mount a row of blades on the periphery of a disk or other rotor structure by sliding the roots of the blades into dovetail grooves extending more or less axially across a rim or flange on the rotor. Some arrangement must be provided to hold or lock the blades in place in the slots, and many arrangements for this purpose have been proposed.

My invention is directed to blade locks which are particularly advantageous from the standpoints of positive retention of the blade, ease of application and removal of the lock, light weight, and simplicity of structure leading to manufacturing economies.

The principal objects of the invention are to improve the retention of blades on turbomachine rotors and to provide an improved blade lock for such machines.

The nature of the invention and the advantages thereof will be clear to those skilled in the art from the succeeding detailed description and drawings of the preferred embodiments of the invention.

FIGURE 5 is a view similar to FIGURE 1 illustrating a second embodiment of the invention.

FIGURE 6 is a fragmentary front elevation view of the same taken on the plane indicated by the line 6—6 in FIGURE 5.

FIGURE 7 is a fragmentary sectional view, with parts removed, taken on the plane indicated by the line 7—7 in FIGURE 5.

FIGURE 8 is an enlarged view of a portion of FIGURE 5.

FIGURE 9 is a view similar to FIGURE 1 illustrating a third embodiment of the invention.

FIGURE 10 is a fragmentary front elevation view of the same taken on the plane indicated by the line 10—10 in FIGURE 9.

FIGURE 11 is a fragmentary sectional view taken on the plane indicated by the line 11—11 in FIGURE 9.

FIGURE 12 is an enlarged view of a portion of FIGURE 9.

FIGURE 13 is a fragmentary sectional view taken on the plane indicated by the line 13—13 in FIGURE 12.

Figure 1:
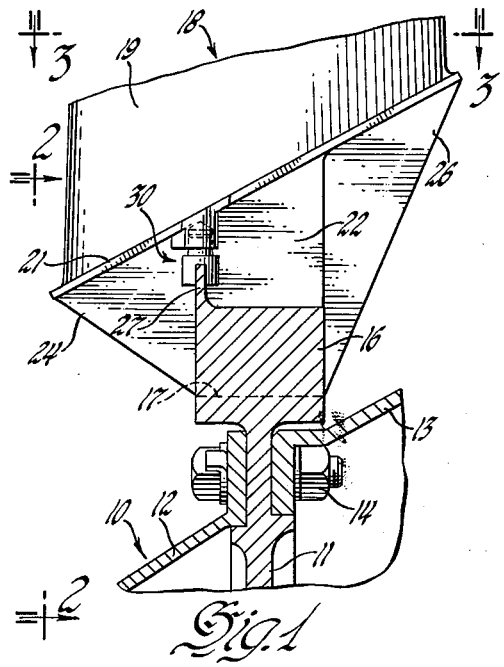
FIGURE 1 is a fragmentary sectional view of an axial flow compressor rotor taken on a plane containing the axis of the rotor, illustrating a first embodiment of the invention.
Figure 2:
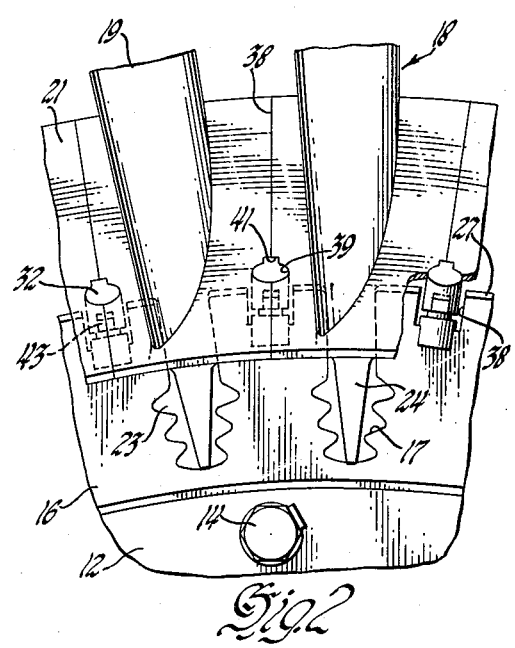
FIGURE 2 is a fragmentary front elevation view of the same taken on the plane indicated by the line 2—2 in FIGURE 1.
Figure 3:
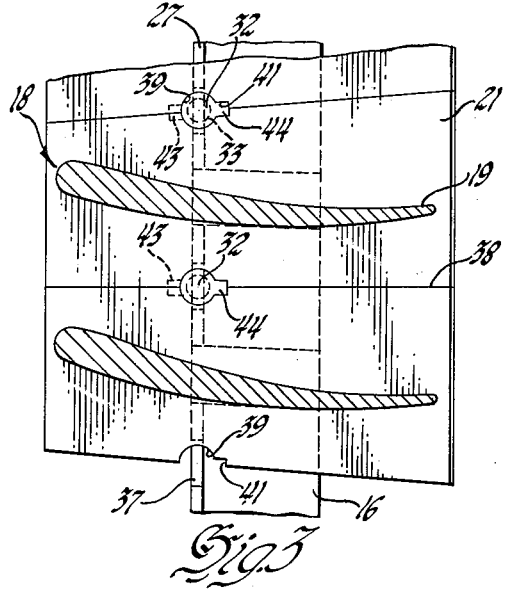
FIGURE 3 is a fragmentary sectional view taken on the plane indicated by the line 3—3 in FIGURE 1.

Referring first to FIGURES 1 and 2 for a description of an illustrative embodiment of the invention, a compressor rotor 10 comprises one or more disks 11, only one of which is shown. The disks may be connected by spacer rings such as 12 and 13 fixed to the disk 11 adjacent the rim thereof by bolts and nuts 14. The disk 11 has a relatively heavy rim or flange 16 in which are cut dovetail slots 17 extending across the rim of the wheel. These slots may be parallel to the axis or may be inclined or skewed with respect to the axis.

A number of rotor blades 18 are mounted on the rim 16 of disk 11. Each blade comprises an airfoil or blade portion 19, a blade platform 21, a stalk 22, and a root 23, the root being configured for mounting in the slot 17. The stalk connects the root to the platform and the airfoil extends outwardly from the platform. The platforms of adjacent blades abut to provide the inner boundary of the flow path through the rotor stage. Webs 24 and 26 extend from the forward and rear faces of the root and stalk to the blade platform. An interrupted air baffle flange 27 extends from the rim to close the spaces between the stalks 22. It will be understood that the rotor structure so far described is merely illustrative of one type of rotor structure to which the invention may be applied.

Considering now the form of blade lock illustrated in FIGURES 1 to 4, the blade locking means locks the blade to the rotor so that it is fixed in position in the blade slot 17. The locking means 30 of FIGURES 1 to 4 comprises an inner member 31 and an outer member 32. The inner member is generally cylindrical and includes a pilot portion or boss 33 which extends into a circular hole 34 in the outer member. The inner member has a slot 36 which straddles the edge 37 of a notch 38 in the air baffle flange 27. This notch is disposed immediately inwardly of the joining line 38 of adjacent blade platforms.

Openings are provided in the blade platforms to receive the outer member 32. In the form shown in FIGURES 1 to 4, the complete opening 39 is defined by aligned openings or recesses in the margins of the blade platforms. As will be seen particularly in FIGURE 3, the opening 39 is non-circular, although the major portion of the opening is circular, since it includes a notch 41 extending from the circular portion of the opening. This opening is large enough to permit the inner member 31 to be inserted through the opening and lodged in the notch in the air baffle flange, if desired, although the blade may be slid into the slot 17 with the member 31 in place.

The outer locking member 32 comprises a generally cylindrical body portion 42 having a lug 43 extending from one end of the body and a deformable tab 44 extending from the other end of the body. The lug and the tab preferably extend in opposite directions from the axis of the body. The notch 41 is of sufficiently large dimensions that the lug 43 will pass through it when the locking member 32 is rotated 180° from the position shown in the figures.

Figure 4:
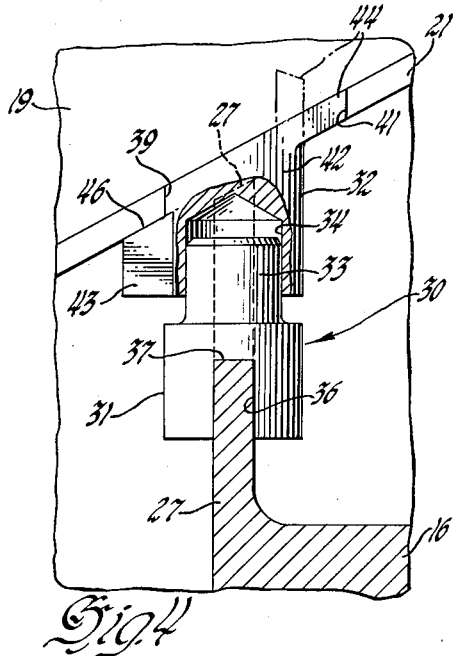
FIGURE 4 is an enlarged view of a portion of FIGURE 1.

Before the member 32 is inserted, the deformable tab 44 is disposed generally axially of the body as indicated by the broken line in FIGURE 4. To install this member, the body 42 and lug 43 are inserted through the opening 39 with the lug passing through notch 41, and the portion 33 of the inner locking member entering the hole 34 in the outer locking member. The outer member is then rotated about its axis until the tab 44 is aligned with the notch 41 and the tab is bent down to coincide with the surface of the platform and lie within the notch 41. In this position, the outer face 46 of the lug 43 engages the inner surface of the platform. This lug thus prevents the inner and outer locking members from flying out of the rotor under the effect of centrifugal force. The engagement of the inner locking member with the air baffle flange on the rotor, the inter-engagement of the two locking members, and the engagement of the outer locking member with the blade platforms prevents any movement of the blade in the slot. The blade lock may be removed by pressing up the bendable tab 44 from within the platform, rotating the outer member and lifting it through the opening 39, thus freeing the blade for removal.

As will be apparent, each blade lock secures two blades and each blade is secured by two blade locks, if desired. One blade lock may be provided for each second blade position, or in other words, every other one of the locks as shown in FIGURE 2 may be omitted.

FIGURES 5 to 8 show a second form of blade lock which is similar in principle and to a considerable degree in structure to that just described. The parts which essentially duplicate those previously described are indicated by the same reference numerals as in FIGURES 1 to 4 and need not be described again. The blade platform 21' and the air baffle flange 27' are modified from those previously described to accommodate the different blade locking member. The platform 21' is similar to the platform 21 previously described except that the opening 39 is entirely defined by a single platform rather than by the edges of two adjacent platforms. Thus, each locking member locks only one blade. The air baffle flange 27' has a portion 51 of thicker section lying under each opening 39, and a radial holes 52 is drilled in each thickened section aligned with the opening 39. The locking member 53 is similar, in general, to the outer locking member 32 of FIGURES 1 to 4 except that it is provided with a pin or boss 54 of reduced section which extends into the hole 52. It will be seen that in this form of the invention the inner locking member is dispensed with and the locking member 53 coacts directly with both the air baffle flange and the blade platform. The locking member is inserted in the same manner as the member 32 previously described and retained by the deformable tab 44 as previously described. The shoulder 56 on the locking member engages a surface 57 on the air baffle flange 27' which is cut below the remainder of the periphery of the flange 27'.

The form of the invention illustrated in FIGURES 5 to 8 is advantageous over that of FIGURES 1 to 4 in that the locking means is simpler. On the other hand, a more complicated air baffle flange is required. It will be apparent that the locking means of FIGURES 1 to 4 may be employed with a hole 39 in a single blade platform and that the locking means of FIGURES 5 to 8 may be employed with a hole defined by the margins of two adjacent blade platforms.

The third form of locking means, illustrated in FIGURES 9 to 13, may also employ the same wheel and blade structure as previously described, except that the air baffle flange may be dimensioned somewhat differently. This flange is therefore identified as 27". A blade having the platform 21' with the opening 39 within a single blade platform is illustrated. The blade locking means 60 of this form of the invention comprises a generally cylindrical body 61 with two diametrically opposed projections 62 extending from the inner end of the body. As will be seen, projections are bounded by flat faces and are so dimensioned that these faces engage the front and rear faces of the air baffle flange 27" in either of two positions of rotation of the retaining member about a radial axis, these positions being 90° apart as illustrated. The opening 39 with the notch 41 may be the same as previously described and the body of the retaining member has a deformable tab 44 as previously described. A lug 71 projects radially from the body 61. This lug 71 is dimensioned so that it may pass through the notch 41 and will lie against the outer margin 72 of the air baffle flange 27" after the retaining member has been rotated 90°. The outer surface 73 of the lug bears against the radially inner surface of the blade platform in this position. When the retaining member has been inserted and rotated 90°, the tab 44 is bent down into the notch 41 to hold the retaining member against rotation. The lug 73 then caught under the platform prevents the retaining member from moving radially outward, and since the projections 62 straddle the aid baffle flange and the body of the retainer fits in the opening 39, the blade is restrained against movement in the slot. It will be apparent that the locking member 60 may be applied at the junction of two adjacent blade platforms similarly to the retaining member 32 of FIGURES 1 to 4.

The detailed description of preferred embodiments of the invention for the purpose of explaining the principles thereof is not to be regarded as limiting or restricting the invention, since many modifications may be made within the scope of the invention by the exercise of skill in the art.

I claim:

1. A rotor assembly for a turbomachine comprising, in combination, a rotor having a blade receiving slot in the periphery thereof; a blade having a root slidably mounted in the slot and a platform disposed adjacent the rotor, the platform having a non-circular opening therein; means on the rotor aligned with the opening adapted to engage a locking means; and locking means comprising a generally cylindrical body having an axis and engaging the said means on the rotor, a lug on the body dimensioned to pass through the opening and engageable with the inner surface of the platform, and a deformable tab on the body deformable into the opening to restrain the locking means against rotation about its said axis, the lug and tab being relatively angularly displaced about the axis of the body.

2. A rotor assembly as recited in claim 1 in which the locking means has a hole therein and the means on the rotor includes a boss entering the hole.

3. A rotor assembly as recited in claim 1 in which the locking means has a boss extending axially of and from the body thereof and the means on the rotor defines a hole receiving the boss.

4. A rotor assembly as recited in claim 1 in which the means on the rotor is a flange thereon and the locking means includes parts straddling the said flange.

5. A rotor assembly as recited in claim 1 in which the locking means includes two telescoping members, one member engaging the means on the rotor and the other member engaging the blade platform.

6. A rotor assembly for a turbomachine comprising, in combination, a rotor having a blade receiving slot in the periphery thereof; a blade having a root slidably mounted in the slot and a platform disposed adjacent the rotor, the platform having a non-circular opening therein, the opening being of partially circular contour with a notch extending from one side of the opening; means on the rotor aligned with the opening adapted to engage a locking member; and a locking member comprising a generally cylindrical body having an axis and engaging the said means on the rotor, a lug on the body dimensioned to pass through the notch and engageable with the inner surface of the platform, and a deformable tab on the body deformable into the notch to restrain the member against rotation about its said axis, the lug and tab being relatively angularly displaced about the axis of the body.

7. A rotor assembly as recited in claim 6 in which the locking member has a hole therein and the means on the rotor includes a boss entering the hole.

8. A rotor assembly as recited in claim 6 in which the locking member has a boss extending axially of and from the body thereof and the means on the rotor defines a hole receiving the boss.

9. A rotor assembly as recited in claim 6 in which the means on the rotor is a flange thereon and the locking member includes parts straddling the said flange.

10. A rotor assembly as recited in claim 6 in which the locking member includes two telescoping parts, one part engaging the means on the rotor and the other part engaging the blade platform.

References Cited in the file of this patent

UNITED STATES PATENTS

| | | |
|---|---|---|
| 2,620,539 | Poupitch | Dec. 9, 1952 |
| 2,867,408 | Kolb et al. | Jan. 6, 1959 |